(12) United States Patent
Yi et al.

(10) Patent No.: US 12,366,735 B2
(45) Date of Patent: Jul. 22, 2025

(54) IMAGE SENSOR FOR ZOOM PROCESSING AND ELECTRONIC DEVICE INCLUDING THE SAME

(71) Applicant: SAMSUNG ELECTRONICS CO., LTD., Suwon-si (KR)

(72) Inventors: Eunjik Yi, Seoul (KR); Younggyu Jung, Hwaseong-si (KR); Jeongwook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 748 days.

(21) Appl. No.: 17/720,931

(22) Filed: Apr. 14, 2022

(65) Prior Publication Data

US 2022/0334357 A1    Oct. 20, 2022

(30) Foreign Application Priority Data

Apr. 20, 2021    (KR) .................. 10-2021-0051406

(51) Int. Cl.
| | |
|---|---|
| *G02B 13/00* | (2006.01) |
| *G02B 5/20* | (2006.01) |
| *G06T 1/20* | (2006.01) |
| *G06T 3/4015* | (2024.01) |

(52) U.S. Cl.
CPC .......... *G02B 13/009* (2013.01); *G02B 5/201* (2013.01); *G06T 1/20* (2013.01); *G06T 3/4015* (2013.01); *G06T 2207/20024* (2013.01)

(58) Field of Classification Search
CPC ...... G02B 13/009; G02B 5/201; G02B 7/102; G06T 1/20; G06T 3/4015; G06T 2207/20024; G06T 3/40; G06T 3/4038; G06T 2207/20132; H04N 5/2628; H04N 5/265; H04N 23/54; H04N 23/80; H04N 23/843

See application file for complete search history.

(56) References Cited

U.S. PATENT DOCUMENTS

| | | | |
|---|---|---|---|
| 8,106,956 B2 | 1/2012 | Nikkanen et al. | |
| 8,482,636 B2 | 7/2013 | Cohen et al. | |
| 8,547,454 B2 | 10/2013 | Kim et al. | |
| 9,485,432 B1 | 11/2016 | Medasani et al. | |
| 11,776,088 B2 * | 10/2023 | Kang | ................ G06T 7/80 382/100 |
| 2007/0133902 A1 | 6/2007 | Kumar | |
| 2012/0236181 A1 | 9/2012 | Noyes | |
| 2020/0077026 A1 | 3/2020 | Jeong et al. | |

(Continued)

FOREIGN PATENT DOCUMENTS

KR    10-1739378    5/2017

*Primary Examiner* — Hung H Lam
(74) *Attorney, Agent, or Firm* — MORGAN, LEWIS & BOCKIUS LLP

(57) ABSTRACT

Disclosed is an electronic device which includes a first image sensor that photographs in a first field of view to generate a first signal, and an image signal processor that generates first image data based on the first signal, the first image data being of a non-Bayer pattern. When a zoom factor is less than a first value, the image signal processor crops the first image data to generate second image data, executes remosaic on the second image data to generate third image data of a Bayer pattern, and executes down-scaling on the third image data to generate fourth image data.

20 Claims, 13 Drawing Sheets

(56) References Cited

U.S. PATENT DOCUMENTS

| | | | |
|---|---|---|---|
| 2021/0090222 A1* | 3/2021 | Lee | G06T 3/40 |
| 2021/0390747 A1* | 12/2021 | Feng | G06T 11/60 |
| 2023/0199337 A1* | 6/2023 | Wang | G06T 5/92 |
| | | | 348/240.2 |
| 2023/0230199 A1* | 7/2023 | Swami | G06T 5/20 |
| | | | 382/167 |
| 2024/0251180 A1* | 7/2024 | Zhang | H04N 25/443 |

* cited by examiner

IMAGE SENSOR FOR ZOOM PROCESSING AND ELECTRONIC DEVICE INCLUDING THE SAME

CROSS-REFERENCE TO RELATED APPLICATIONS

This application claims priority under 35 U.S.C. § 119 to Korean Patent Application No. 10-2021-0051406 filed on Apr. 20, 2021, in the Korean Intellectual Property Office, the disclosure of which is incorporated by reference herein in its entirety.

TECHNICAL FIELD

The present disclosure relates to an image sensor, and more particularly, the present disclosure relates to an image sensor capable of zoom processing and an electronic device including the same.

DISCUSSION OF THE RELATED ART

Many user electronic devices contain cameras with image sensors. There are multiple types of image sensors, such as charge coupled device (CCD) image sensors, complementary metal-oxide semiconductor (CMOS) image sensors (CIS), and others. The CMOS image sensor includes pixels implemented with CMOS transistors and converts light energy into an electrical signal using a photoelectric conversion element included in each pixel. The CMOS image sensor obtains information about a captured/photographed image by using the electrical signal generated by each pixel.

Recent electronic devices are being fabricated with increasing numbers of pixels to provide a user with a high-magnification zoom-in, as well as an image and/or a video of an ultra-high resolution (e.g., ultra-high-definition (UHD)). However, the process of digital zoom-in includes cropping and enlarging a portion of a photographed image, and is limited in resolution to the final cropped portion of the original image. Accordingly, as a zoom factor becomes greater, the quality of image decreases. There is a need in the art for a zoom processing scheme which increases the quality of image and/or video that is provided to the user during the zoom-in operation.

SUMMARY

Embodiments of the present disclosure provide a method and a device for providing an image and/or a video of an increased quality while performing zoom-in.

An electronic device according to the present disclosure may include one or more image sensors which each include a relatively high number of pixels; e.g., are capable of producing high resolution images. In some environments, the image sensors may be configured to capture images at a lower resolution in order to achieve increased low-light information. For example, a four-pixel group arranged in a 2×2 pattern may capture light and interpret the signal as 1 pixel of light intensity information. In other environments, the four-pixel group arranged in the 2×2 pattern may capture light as 4 pixels of light intensity information in multiple colors. When the light information is captured in a low resolution mode, the original high resolution data may be saved to be restored in a future process. This "remosaic" process will be described later.

According to an embodiment, an electronic device includes a first image sensor configured to photograph in a first field of view to generate a first signal and an image signal processor configured to generate first image data based on the first signal, where the first image data is of a non-Bayer pattern. When a zoom factor is smaller than a first value, the image signal processor is configured to: crop the first image data to generate second image data, execute remosaic on the second image data to generate third image data of a Bayer pattern, and execute down-scaling on the third image data to generate fourth image data.

According to an embodiment, an image processing method may include photographing, through a first image sensor and in response to a zoom factor, a scene in a first field of view to generate a first signal, when the zoom factor is smaller than a first value; generating, through an image signal processor, first image data based on the first signal, where the first image data is of a non-Bayer pattern; cropping, through the image signal processor, the first image data to generate second image data; executing, through the image signal processor, remosaic on the second image data to generate third image data of a Bayer pattern; and executing, through the image signal processor, down-scaling on the third image data to generate fourth image data when the zoom factor is smaller than the first value.

According to an embodiment, an electronic device may include a first image sensor configured to photograph in a first field of view to generate a first signal, in a first zoom factor section; a second image sensor configured to photograph in a second field of view to generate a second signal, in a second zoom factor section; and an image signal processor configured to generate first image data based on the first signal in the first zoom factor section and to generate second image data based on the second signal in the second zoom factor section, where the first image data and the second image data are each of a non-Bayer pattern. In the first zoom factor section, the image signal processor is configured to: crop the first image data to generate first cropping data; execute remosaic on the first cropping data to generate first remosaic data of a Bayer pattern; and execute down-scaling on the first remosaic data to generate first down-scaling data. In the second zoom factor section, the image signal processor is configured to: crop the second image data to generate second cropping data; execute remosaic on the second cropping data to generate second remosaic data of the Bayer pattern; and execute down-scaling on the second remosaic data to generate second down-scaling data.

BRIEF DESCRIPTION OF THE DRAWINGS

The above and other objects and features of the present disclosure will become apparent by describing in detail embodiments thereof with reference to the accompanying drawings.

DETAILED DESCRIPTION OF THE EMBODIMENTS

Figure 1:
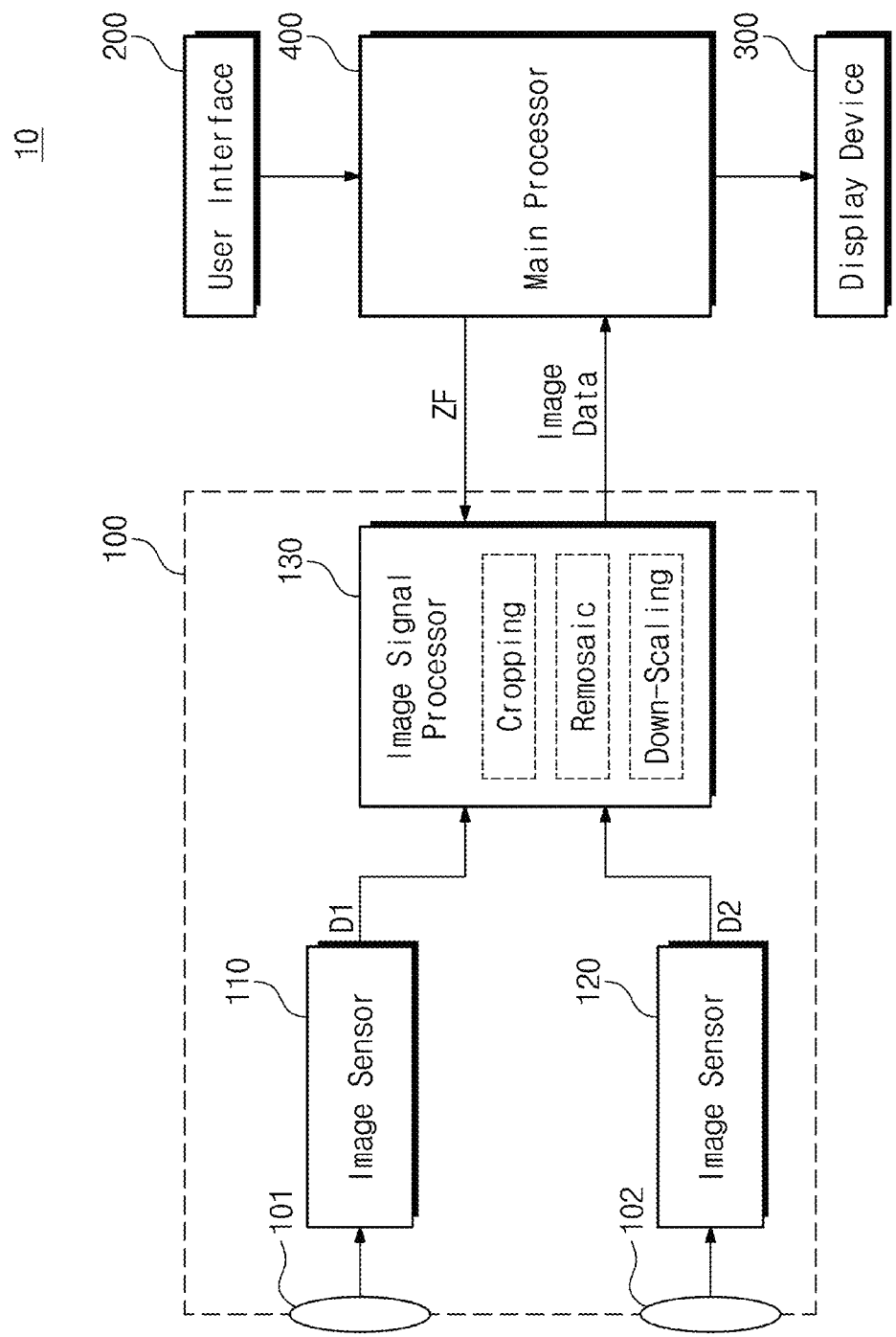
FIG. 1 illustrates a configuration of an electronic device including an image signal processor, according to an embodiment of the present disclosure.

Hereinafter, embodiments will be described in detail with reference to the accompanying drawings. Like reference symbols in the drawings may denote like elements, and to the extent that a description of an element has been omitted, it may be understood that the element is at least similar to corresponding elements that are described elsewhere in the specification.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

FIG. 1 illustrates an example configuration of an electronic device including an image signal processor, according to an embodiment of the present disclosure. An electronic device 10 may include an image processing block 100, a user interface 200, a display device 300, and a main processor 400, and the image processing block 100 may include lenses 101 and 102, image sensors 110 and 120, and an image signal processor 130.

The lenses 101 and 102 may receive a light reflected by an object (including a background, a scenery, etc.). The lenses 101 and 102 may have the same field of view (FOV), or may have field of view that are different from other. An embodiment is illustrated as the image processing block 100 includes two lenses and two image sensors, but the number of lenses and the number of image sensors are not necessarily limited thereto.

The image sensors 110 and 120 may respectively generate signals D1 and D2 based on a light received through the lenses 101 and 102. Each of the image sensors 110 and 120 may include a pixel array that is composed of pixels capable of converting a light into an electrical signal. For example, the image sensors 110 and 120 may include a complementary metal-oxide semiconductor (CMOS) sensor, a charge coupled device (CCD) sensor, etc. The image sensors 110 and 120 may output the signals D1 and D2 by performing correlated double sampling (CDS) on signals output from the pixel arrays thereof.

The image sensors 110 and 120 may have identical or different functions, identical or different performances, and/or identical or different characteristics. For example, the image sensors 110 and 120 may output the signals D1 and D2 associated with images of the same resolution or may output the signals D1 and D2 associated with images of different resolutions. In an example, the image sensors 110 and 120 may have pixels arranged in different patterns. In an example, the image sensors 110 and 120 may include pixels that are arranged in a non-Bayer pattern.

In a process of capturing a series of images and/or a video, the image signal processor 130 may appropriately process the signals D1 and D2 output from the image sensors 110 and 120 and thus may generate image data forming each video frame. In an embodiment, the image signal processor 130 may generate image data based on the first signal D1, and may perform cropping, binning, and/or down-scaling on the generated image data. Also, the image signal processor 130 may generate image data based on the second signal D2, and may perform cropping, binning, and/or down-scaling on the generated image data.

In an embodiment, the image signal processor 130 may generate image data of a relatively high resolution, based on the first signal D1 and/or the second signal D2 (e.g., an output of the image sensor 110). For example, the image signal processor 130 may perform optical zoom or digital zoom based on a zoom factor ZF received from the main processor 400. For example, the image signal processor 130 may control the optical zoom to adjust a focal length of the lenses 101 and 102 based on the zoom factor ZF. Alternatively, to perform a digital zoom, the image signal processor 130 may execute cropping, binning, up-scaling, and/or down-scaling on the image signals D1 and D2 based on the zoom factor ZF.

In an embodiment, to secure the number of valid pixels of an image (or video) that is output during the zoom-in or zoom-out, the image signal processor 130 of the present disclosure may perform image processing based on an image of a full resolution. For example, the image signal processor 130 may crop a region of a full-resolution image, which corresponds to a field of view of a zoom factor. In this case, the number of pixels of the cropped region may be more than the maximum number of pixels capable of being output during the zoom-in or zoom-out. For example, the cropped region captured by the image sensor(s) 110 and/or 120 may contain more pixel information that is able to be displayed to a user. The image signal processor 130 may execute remosaic to convert a pattern of a cropped image into a Bayer pattern. As used herein, "remosaic" may refer to a process which converts a given pixel pattern into a Bayer pattern. The image signal processor 130 may execute down-scaling to reduce the number of pixels of the remosaic-processed image data to the maximum number of pixels capable of being output during the zoom-in or zoom-out.

While the zoom-in is being executed, a general image processing device performs cropping on an image of a reduced resolution (e.g., an image experiencing binning or the like), not an image of a full resolution. In this case, because a data size of the cropped image is smaller than the maximum number of pixels capable of being output during the zoom-in or zoom-out, an image quality is degraded due to the decrease in the number of valid pixels of the image. However, in an electronic device according to the present disclosure, because a cropped image may contain more resolution information than is capable of being output during the zoom-in or zoom-out, the number of valid pixels may be maximally maintained during the zoom-in or zoom-out.

The user interface 200 may arbitrate communication between the user and the electronic device 10. For example, the user interface 200 may include an input interface such as a touch screen, a touch pad, a microphone, a keypad, a button, a vision sensor, a motion sensor, or a gyroscope sensor.

The display device 300 may provide the user with the whole image of a low resolution including at least one region of interest or a partial image of a high resolution corresponding to only at least one region of interest. The display device 300 may include an organic LED (OLED) display device, an active matrix OLED (AMOLED) display, a light-emitting diode (LED) display device, a liquid crystal display (LCD) device, etc.

The main processor 400 may be configured to perform various operations for the purpose of controlling overall operations of the electronic device 10. For example, the main processor 400 may be implemented with a general-purpose processor, a special-purpose processor, or an application processor, and may include one or more processor cores. The main processor 400 may control the image processing block 100 for the purpose of obtaining image data associated with an object outside the electronic device 10. For example, to control a focal length of the lenses, the main processor 400 may transmit the zoom factor ZF, which is based on a user input, to the image signal processor 130.

The main processor 400 may provide the user with image data processed by the image signal processor 130 or a video including the image data through the display device 300. In addition, the main processor 400 may record a video including image data processed by the image signal processor 130. For example, the main processor 400 may encode or process the image data into a video.

Meanwhile, the main processor 400 may receive image data from the image signal processor 130 through a camera serial interface (CSI). The main processor 400 may include a CSI receiver, and the image signal processor 130 may include a CSI transmitter. The CSI receiver and the CSI transmitter may be interconnected through a plurality of lanes.

Figure 2:
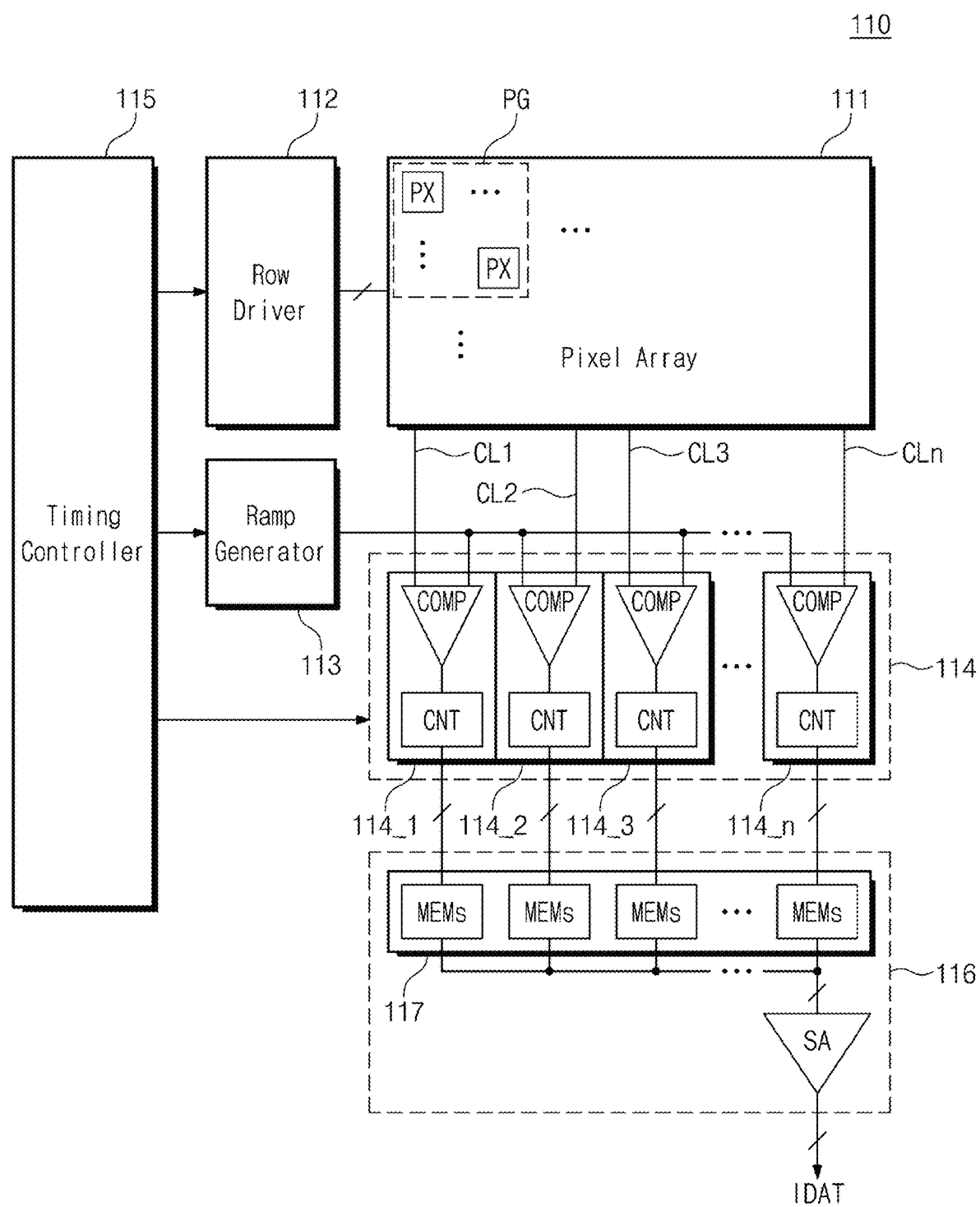
FIG. 2 illustrates an example configuration of the image sensors of FIG. 1.

FIG. 2 illustrates an example configuration of the image sensors 110 and 120 of FIG. 1. In an embodiment, a configuration of the first image sensor 110 is illustrated in FIG. 2. The image sensor 110 may include a pixel array 111, a row driver 112, a ramp signal generator 113, an analog-to-digital converting block (hereinafter referred to as an "ADC block") 114, a timing controller 115, and a buffer 116.

The pixel array 111 may include a plurality of pixels PX arranged in rows and columns, that is, in the form of a matrix. Each of the plurality of pixels PX may include a photoelectric conversion element. Each of the plurality of pixels PX may sense a light intensity by using the photoelectric conversion element and may convert the sensed light into an electrical signal (hereinafter referred to as a "pixel signal"). For example, the photoelectric conversion element may include a photo diode, a photo transistor, a photo gate, a pinned photo diode, etc.

The plurality of pixels PX constituting the pixel array 111 may be divided into a plurality of pixel groups PG. Each pixel group PG may include two or more pixels PX. In an embodiment, the pixel group PG may include 9 pixels PX arranged in 3 rows and 3 columns or may include 4 pixels PX arranged in 2 rows and 2 columns. However, the number of pixels constituting the pixel group PG is not necessarily limited thereto.

Pixels PX constituting the pixel group PG may share at least one floating diffusion region or two or more floating diffusion regions. For example, the pixels PX constituting the pixel group PG may share only one floating diffusion region. In this case, the pixels PX of each pixel group PG may be connected commonly with one column line (e.g., CL1). Alternatively, the pixels PX constituting the pixel group PG may share a plurality of floating diffusion regions. For example, pixels PX of the pixel group PG belonging to a first column may share a first floating diffusion region, pixels PX of the pixel group PG belonging to a second column may share a second floating diffusion region, and pixels PX of the pixel group PG belonging to a third column may share a third floating diffusion region. In this case, in FIG. 2, the pixels PX of the pixel group PG belonging to the first column may be controlled commonly with the column line CL1, the pixels PX of the pixel group PG belonging to the second column may be controlled commonly with a column line CL2, and the pixels PX of the pixel group PG belonging to the third column may be controlled commonly with a column line CL3.

The pixel group PG may include same type of pixels for outputting information about the same color. For example, the pixel group PG may include red pixels "R" to convert a light in a red spectrum into an electrical signal, green pixels Gr/Gb to convert a light in a green spectrum into an electrical signal, or blue pixels "B" to convert a light in a blue spectrum into an electrical signal. To this end, a plurality of color filters may be formed on the pixel group PG, and thus, a multi-color filter array (multi-CFA) may be implemented.

The row driver 112 may select and drive a row of the pixel array 111. The row driver 112 may decode an address and/or a control signal generated by the timing controller 115 and may generate control signals for selecting and driving a row of the pixel array 111. For example, the control signals may include a signal for selecting a pixel, a signal for resetting a floating diffusion region, a signal for selecting a column line, etc.

The ramp signal generator 113 may generate a ramp signal. The ramp signal generator 113 may operate under control of the timing controller 115. For example, the ramp signal generator 113 may operate in response to a control signal such as a ramp enable signal or a mode signal. When the ramp enable signal is activated, the ramp signal generator 113 may generate the ramp signal with a slope that is set based on the mode signal.

The ADC block 114 may convert an analog signal (e.g., a pixel signal) output from the pixel array 111 into a digital signal. In an embodiment, the ADC block 114 may include a plurality of ADCs 114_1 to 114_n, each of which includes a comparator COMP and a counter CNT. The comparator COMP may compare a pixel signal output through a column line (e.g., one of CL1 to CLn) connected with the comparator COMP with the ramp signal and may output a comparison result. The comparator COMP may operate based on a correlated double sampling (CDS) technique to obtain a reset signal and an image signal from a pixel signal and to extract a difference between the reset signal and the image signal as an effective signal component.

The counter CNT may count pulses of an output signal of the corresponding comparator COMP. For example, the counter CNT may operate in response to various control signals, which are generated by the timing controller 115, such as a counter clock signal, a counter reset signal for controlling a reset of the counter CNT, and an inversion signal for inverting an internal bit of the counter CNT. The counter CNT may count a comparison result signal in response to the counter clock signal and may output a counting result as a digital signal.

The counter CNT may include an up/down counter, a bit-wise inversion counter, etc. An operation of the bit-wise counter may be similar to an operation of the up/down counter. For example, the bit-wise inversion counter may perform a function of up-counting, and a function of converting all internal bits of the counter to obtain the 1's complement when a specific signal is received. The bit-wise counter may perform a reset count and may then invert a result of the reset count to the 1's complement to represent a negative value.

The timing controller 115 may generate a control signal and/or a clock for controlling an operation and/or a timing of each of the row driver 112, the ramp signal generator 113, the ADC block 114, and the counter CNT.

The buffer 116 may include a set 117 of memories MEMs and a sense amplifier SA. Each of the memories MEMs may store a digital signal output from a corresponding ADC. The sense amplifier SA may sense and amplify the digital signals stored in the memories MEMs. The sense amplifier SA may output the amplified digital signals as image data IDAT. For example, the image data IDAT may include information about a color of an object and information about a phase of the object.

Figure 3:
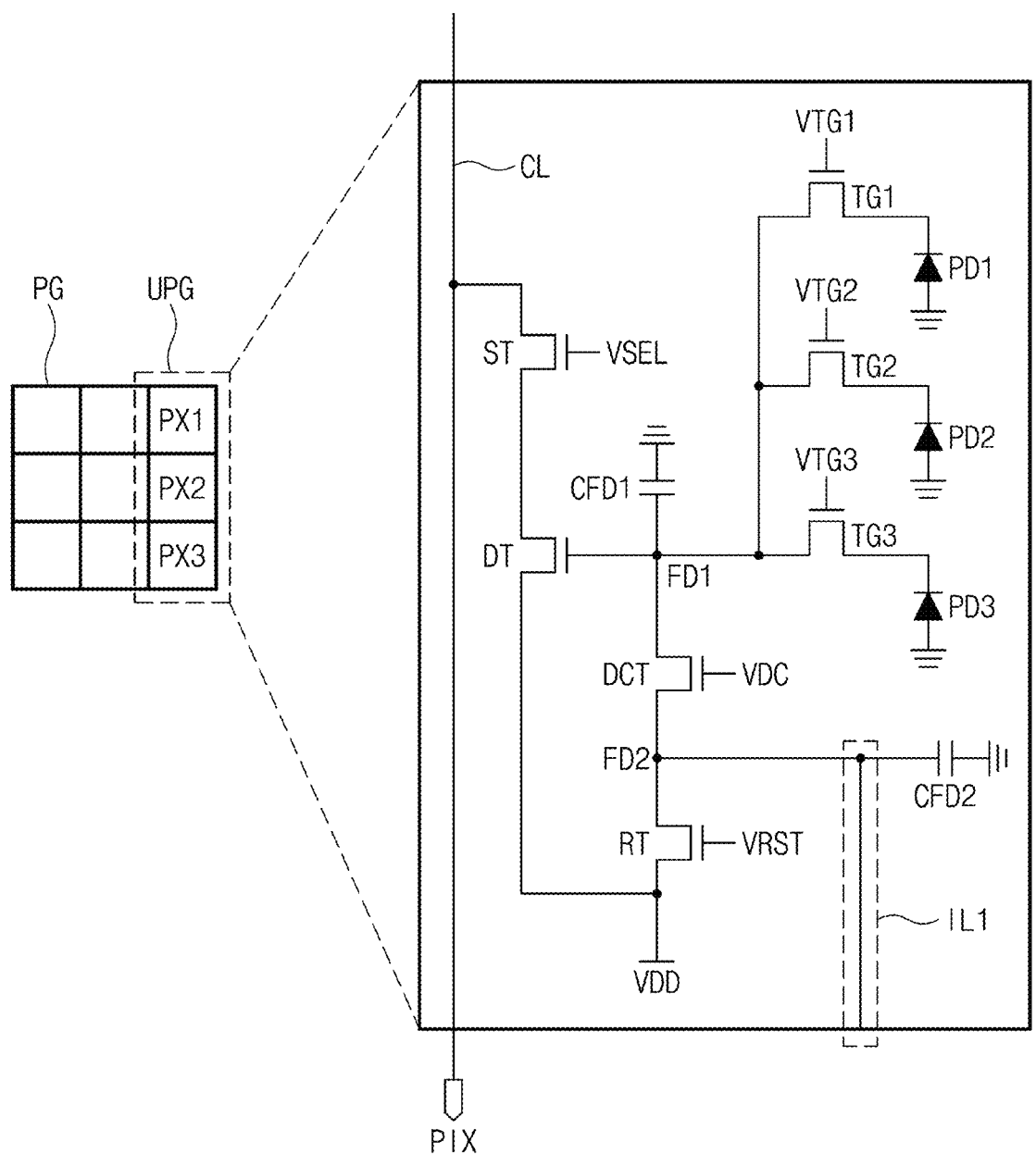
FIG. 3 illustrates an example circuit diagram of the pixel group PG of FIG. 2.

FIG. 3 illustrates an example of a circuit diagram of a pixel group PG of FIG. 2. For example, the pixel group PG of FIG. 3 may be included in a pixel array of the first image sensor 110 (refer to FIG. 1). The pixel group PG may include three unit pixel groups UPG, and each unit pixel group UPG includes three pixels PX1 to PX3. For example, the unit pixel group UPG may include 3 pixels in a column, and the pixel group PG may include three unit pixel groups UPG disposed next to each other. Each unit pixel group UPG may include photoelectric conversion elements PD1 to PD3, transfer transistors TG1 to TG3, a dual conversion transistor DCT, a reset transistor RT, a drive transistor DT, and a select transistor ST.

The first pixel PX1 may include the first photoelectric conversion element PD1 and the first transfer transistor TG1. The second pixel PX2 may include the second photoelectric conversion element PD2 and the second transfer transistor TG2, and the third pixel PX3 may include the third photoelectric conversion element PD3 and the third transfer transistor TG3. The first to third pixels PX1 to PX3 may share the reset transistor RT, the drive transistor DT, and the select transistor ST.

The transfer transistors TG1 to TG3 may transfer charges generated by the photoelectric conversion elements PD1 to PD3 to a first floating diffusion region FD1. For example, while the transfer transistor TG1 is turned to an open mode by a transfer signal VTG1 received from the row driver 112 (refer to FIG. 2), charges provided from the photoelectric conversion element PD1 may be integrated in the first floating diffusion region FD1. Operations of the transfer transistors TG2 and TG3 may be similar to the operation of the transfer transistor TG1, and thus, charges provided from the photoelectric conversion elements PD2 to PD3 may be integrated in the first floating diffusion region FD1. First ends of the transfer transistors TG1 to TG3 may be respectively connected with the photoelectric conversion elements PD1 to PD3, and second ends thereof may be connected commonly with the first floating diffusion region FD1.

The first floating diffusion region FD1 may integrate charges converted by at least one of the photoelectric conversion elements PD1 to PD3. In an embodiment, a capacitance of the first floating diffusion region FD1 may be a first capacitance CFD1. The first floating diffusion region FD1 may be connected with a gate terminal of the drive transistor DT that operates as a source follower amplifier. As a result, a voltage potential corresponding to the charges integrated in the first floating diffusion region FD1 may be formed.

The reset transistor RT may be turned on by a reset signal VRST and may provide a reset voltage (e.g., a power supply voltage VDD) to the first floating diffusion region FD1. In this case, the charges integrated in the first floating diffusion region FD1 may move to a terminal for the power supply voltage VDD, and a voltage of the first floating diffusion region FD1 may be reset.

The drive transistor DT may amplify a change of an electrical potential of the first floating diffusion region FD1 and may generate a voltage (e.g., a pixel signal PIX) corresponding to a result of the amplification. The select transistor ST may be driven by a selection signal VSEL and may select pixels to be read out in row units. As the select transistor ST is turned on, the pixel signal PIX may be output through a column line CL.

Meanwhile, in standard lighting conditions, because the first floating diffusion region FD1 is not easily saturated, there is no need to increase the capacitance (e.g., CFD1) of the first floating diffusion region FD1. However, in a high-illuminance environment, the first floating diffusion region FD1 may be easily saturated. Accordingly, to prevent the saturation, the dual conversion transistor DCT may be turned on such that the first floating diffusion region FD1 and a second floating diffusion region FD2 are electrically connected. In this case, a capacitance of the floating diffusion regions FD1 and FD2 may be expanded to include a sum of both the first capacitance CFD1 and a second capacitance CFD2.

In addition, the second floating diffusion region FD2 may be electrically connected with a floating diffusion region of an adjacent unit pixel group (not illustrated) through a connecting line IL1. In this case, the capacitance of the first floating diffusion region FD1 may be further expanded. To this end the unit pixel group UPG may further include a switching element (e.g., an element such as the dual conversion transistor DCT) for electrically connecting the second floating diffusion region FD2 with the floating diffusion region of the adjacent unit pixel group.

In an embodiment, in the case where an image processing device operates in a normal mode, the pixel signals PIX respectively output from pixels constituting the third unit pixel group UPG3 may be individually used. For example, the timing controller 115 (refer to FIG. 2) may independently control the transfer signals VTG1 to VTG3 such that the transfer transistors TG1 to TG3 are individually turned on at different timings, and thus, the pixel signals PIX corresponding to charges converted by the photoelectric conversion elements PD1 to PD3 may be output through the column line CL at different timings.

In an embodiment, in the case where an image processing device operates in a binning mode, charges converted by the pixels PX1 to PX3 constituting the third unit pixel group UPG3 may be used simultaneously to generate one pixel signal PIX. For example, as the transfer transistors TG1 to TG3 are turned on at the same time or at different timings, charges converted by the pixels PX1 to PX3 may be integrated in the first floating diffusion region FD1, and the pixel signal PIX corresponding to a sum of the charges converted by the photoelectric conversion elements PD1 to PD3 may be output through the column line CL. In some cases, the binning mode operation may be used in low-luminance conditions to obtain increased low light detail.

Figure 4:
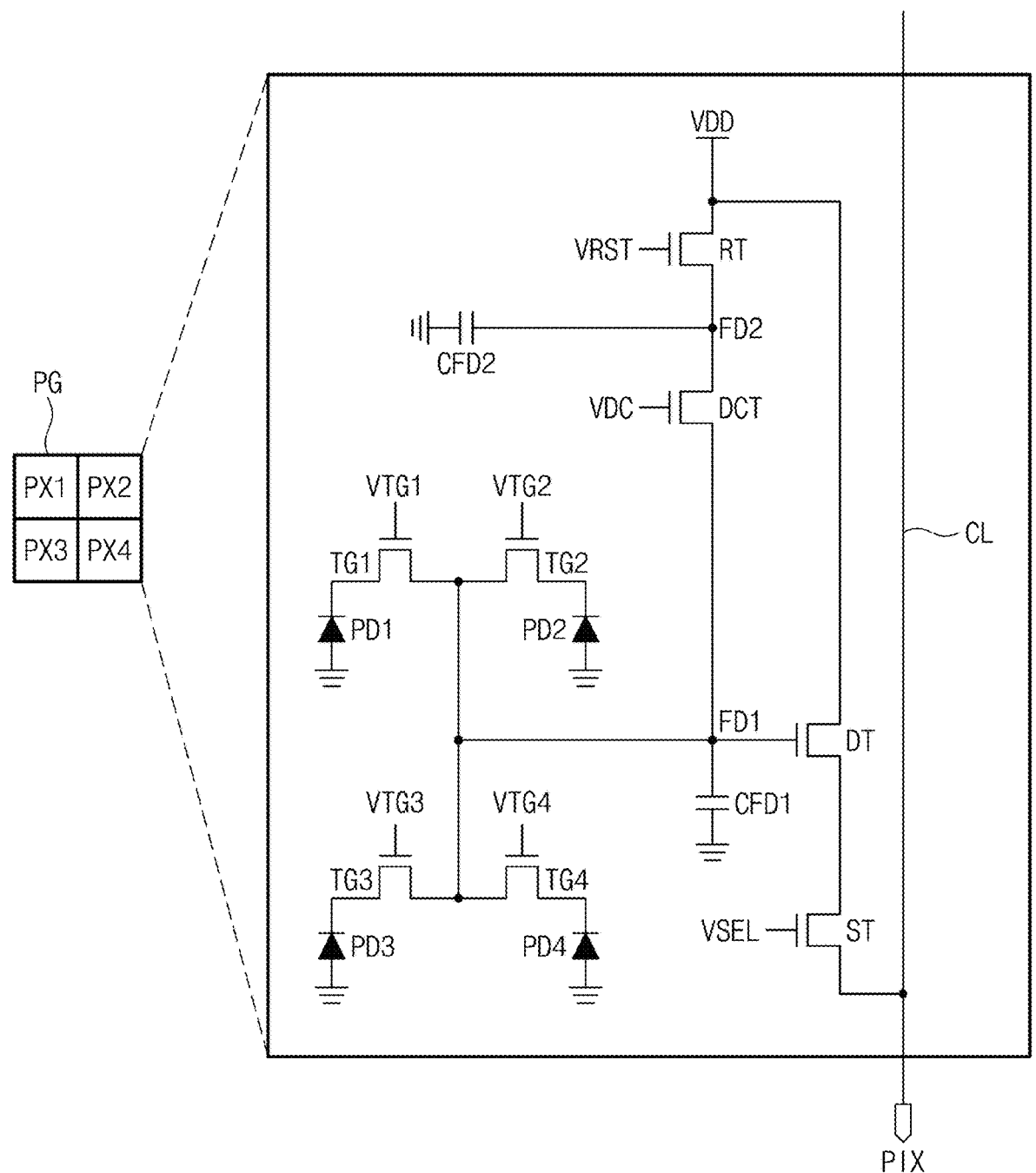
FIG. 4 illustrates an example circuit diagram of the pixel group PG of FIG. 2.

FIG. 4 illustrates a circuit diagram of a pixel group PG of FIG. 2. For example, the pixel group PG of FIG. 4 may be included in a pixel array of the second image sensor 120 (refer to FIG. 1).

The pixel group PG may include photoelectric conversion elements PD1 to PD4, transfer transistors TG1 to TG4, a dual conversion transistor DCT, a reset transistor RT, a drive transistor DT, and a select transistor ST. A first pixel PX1 may include the first photoelectric conversion element PD1 and the first transfer transistor TG1. A second pixel PX2 may include the second photoelectric conversion element PD2 and the second transfer transistor TG2, and each of the remaining pixels PX3 and PX4 may include similar components/elements. The first to fourth pixels PX1 to PX4 may share the dual conversion transistor DCT, the reset transistor RT, the drive transistor DT, the select transistor ST, and a floating diffusion region FD1.

The expansion of the capacitance of the floating diffusion region FD1 by the dual conversion transistor DCT, the operation of the transfer transistors TG1 to TG4, and the operations of the reset transistor RT, the drive transistor DT, the select transistor ST may be similar to those described with reference to FIG. 3, and thus, similar description thereof will be omitted to avoid redundancy.

Figure 5:
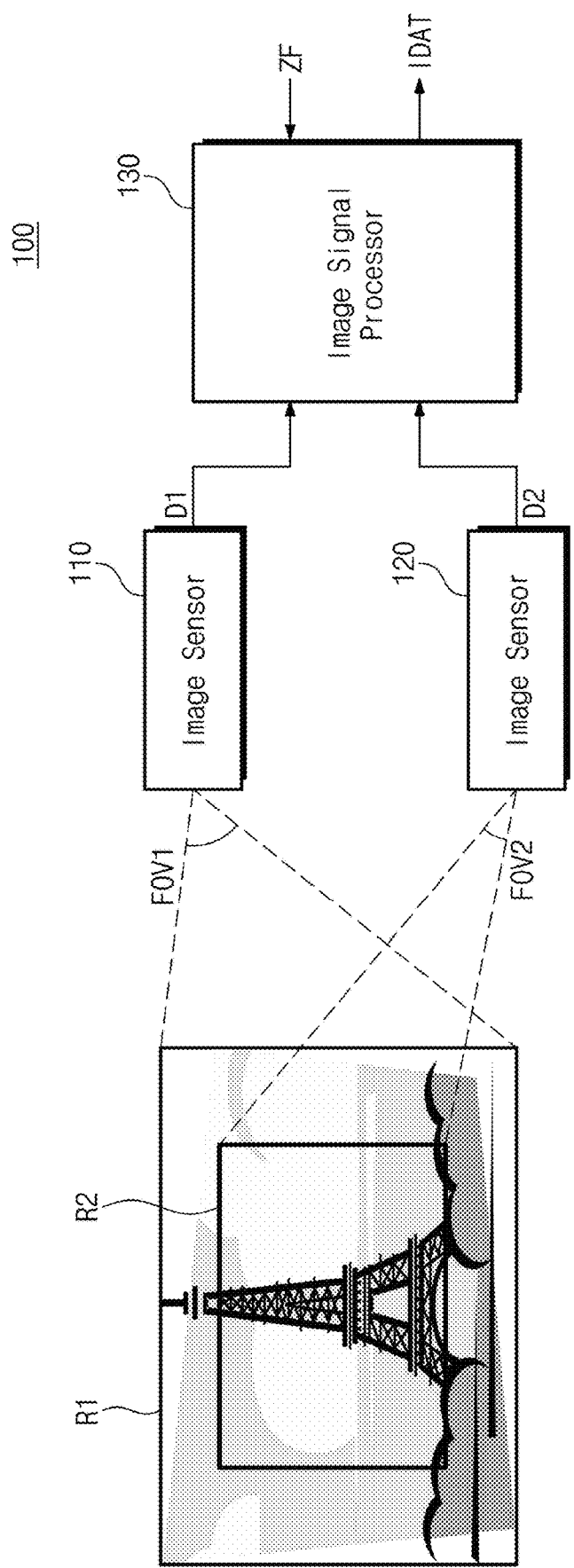
FIG. 5 is a block diagram for describing operations of image sensors of FIG. 1.

FIG. 5 is a block diagram for describing operations of image sensors of FIG. 1.

Referring to FIGS. 1 and 5, the first image sensor 110 may photograph a region R1 at a first field of view FOV1, and the second image sensor 120 may photograph a region R2 at a second field of view FOV2. For example, the first field of view FOV1 may be greater than the second field of view FOV2. For example, the first image sensor 110 may operate to generate an image of a relatively wide field of view, and the second image sensor 120 may operate to generate an image of a relatively narrow field of view. For example, the first lens 101 may be a wide lens or an ultra-wide lens, and the second lens 102 may be a tele (e.g., a "telephoto") lens.

In an embodiment, while the zoom-in is executed from a default zoom factor (e.g., ZF=1) to a zoom factor (e.g., ZF=RV) of reference value, the first image sensor 110 may operate. The second image sensor 120 may operate in a zoom factor section (e.g., ZF>RV) of a specific zoom factor or great. An image that is provided to the user in this process may decrease from (e.g., digitally zoom in from) the region R1 corresponding to the first field of view FOV1 to the region R2 corresponding to the second field of view FOV2.

The first image sensor 110 may receive a light reflected by an object in a region corresponding to the first field of view FOV1 and may generate the first signal D1 associated with an image of a relatively high resolution based on the received light. In an example, the first image sensor 110 may include a pixel array of a high resolution.

As in the above description, the second image sensor 120 may receive a light reflected by an object in a region corresponding to the second field of view FOV2 and may generate the second signal D2 associated with an image of a relatively low resolution based on the received light. In an example, the second image sensor 120 may include a pixel array of a low resolution.

The image signal processor 130 may generate the image data IDAT based on the first signal D1 and/or the second signal D2. For example, based on the zoom factor ZF, the image signal processor 130 may transmit the image data IDAT, which is based on the first signal D1, to the main processor 400 (refer to FIG. 1) in a specific zoom magnification section. The image signal processor 130 may transmit the image data IDAT, which is based on the second signal D2, to the main processor 400 in another specific zoom magnification section.

Figure 6:
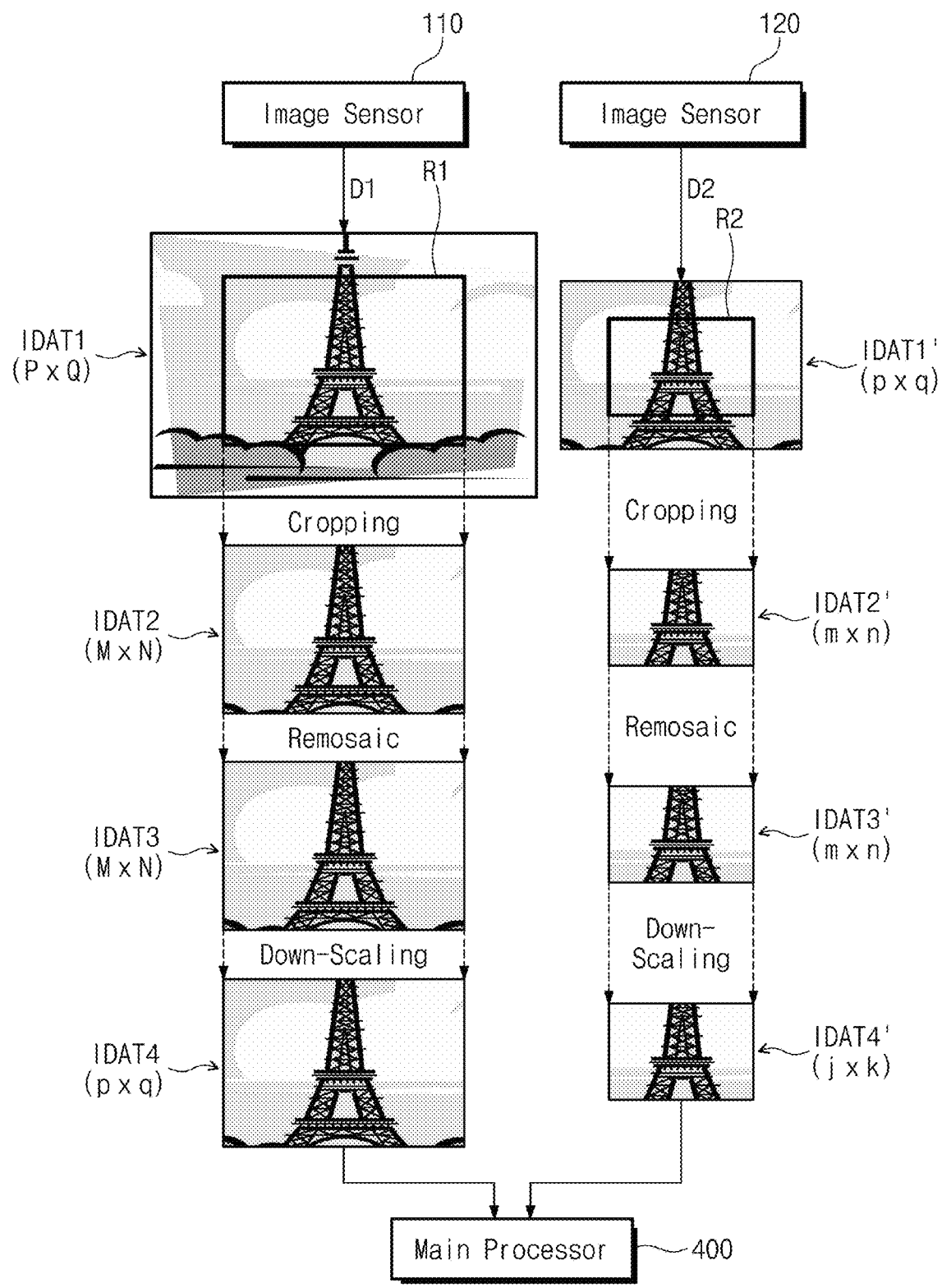
FIG. 6 illustrates an image processing process according to an embodiment of the present disclosure.

FIG. 6 illustrates an image processing process according to an embodiment of the present disclosure.

Image processing that is performed during the zoom-in will be described with reference to FIGS. 1, 5, and 6. The image signal processor 130 may generate first image data IDAT1 based on the first signal D1 output from the first image sensor 110. The first image data IDAT1 may be image data of a full resolution (e.g., P×Q) that has not been binned, down-scaled, etc. The first image data IDAT1 may be an image of a non-Bayer pattern that does not experience remosaic processing.

While the zoom-in is executed according to a user input, an image that is provided to the user may gradually decrease from full-image data (e.g., IDAT1) to R1. To this end, the image signal processor 130 may generate second image data IDAT2 by cropping the region R1 of the first image data IDAT1, which corresponds to a zoom factor received from the main processor 400. A resolution of the cropped region (e.g., M×N) may be smaller than a resolution of the first image data IDAT1.

Afterwards, the image signal processor 130 may perform remosaic processing on the second image data IDAT2. By the remosaic processing, the second image data IDAT2 of a non-Bayer pattern may be converted into third image data IDAT3 of a Bayer pattern. Even though remosaic processing is performed, a resolution (e.g., M×N) of image data might not change, that is, the number of pixels of the image data IDAT3 may be equally maintained from the second image data IDAT2.

The number of pixels of the image data IDAT3 remosaic-processed may still be more than the maximum number of pixels capable of being output during the zoom-in. Accordingly, the image signal processor 130 may execute down-scaling for decreasing the number of pixels of the third image data IDAT3. Fourth image data IDAT4 having a resolution of "p×q" may be generated by the down-scaling. The fourth image data IDAT4 may have the maximum number of pixels capable of being output during the zoom-in. Afterwards, the image signal processor 130 may transmit the fourth image data IDAT4 to the main processor 400 so as to be provided to the user as an image zoomed in.

Meanwhile, in the case where the zoom-in is consistently executed, in a section after a specific zoom factor, the number of pixels of the second image data IDAT2 cropped may be smaller than the maximum number of pixels (e.g., 12 M) capable of being output during the zoom-in or zoom-out. Accordingly, in the section after the specific zoom factor, down-scaling for decreasing the number of pixels of the third image data IDAT3 might not be performed, and the third image data IDAT3 may be transmitted to the main processor 400 without modification.

In the case where the zoom-in is continuously executed, into the section after the specific zoom factor, the second image sensor 120 may operate instead of the first image sensor 110. The image signal processor 130 may generate first image data IDAT1' of a full resolution based on the second signal D2 output from the second image sensor 120. Operations in which the image signal processor 130 executes cropping on the first image data IDAT1' to generate second image data IDAT2', executes remosaic on the second image data IDAT2' to generate third image data IDAT3', and executes down-scaling on the third image data IDAT3' to generate fourth image data IDAT4' may be similar to the operations in the first image sensor 110 described above.

Figure 7:
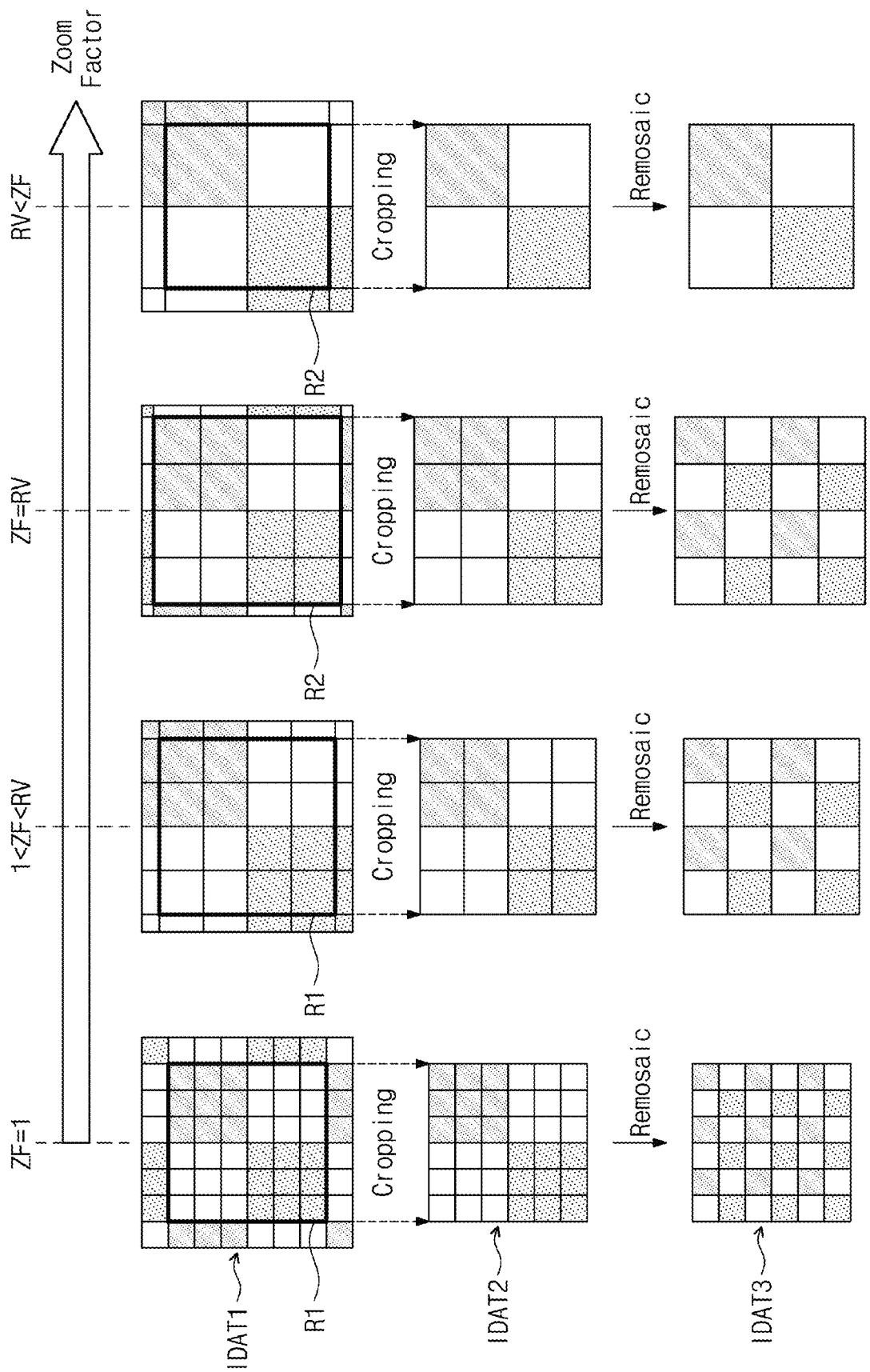
FIG. 7 illustrates an image processing process during zoom-in, according to an embodiment of the present disclosure.

FIG. 7 illustrates an image processing process during zoom-in, according to an embodiment of the present disclosure. In an image processing device of the present disclosure, an image sensor to be operated may be switched (or changed) based on a point where the zoom factor ZF is equal to a reference value RV. For Example, the first image sensor 110 (refer to FIG. 1) may operate in a section in which the zoom factor ZF is greater than or equal to "1" and is smaller than the reference value RV, and the second image sensor 120 (refer to FIG. 1) may operate in a section in which the zoom factor ZF is greater than "4".

As used in this disclosure, if a given value (e.g., a zoom factor) is described as being "between" a first and a second value, the given value may be inclusively between the first and second values. For example, the given value may be equal to the first value, greater than the first value and less than the second value, or equal to the second value. Alternatively, the given value may be set exclusively between the first and second values. Alternatively still, the given value may be set inclusively on one end and exclusively on the other; e.g., first value≤given value<second value.

In the section in which the zoom factor ZF is greater than or equal to "1" and is smaller than the reference value RV, as the zoom factor ZF increases (e.g., as the zoom-in is executed), an object included in the first image data IDAT1 may be expanded. To this end, the image signal processor 130 (refer to FIG. 1) may crop the region R1, the region R1 corresponding to the zoom factor ZF from the first image data IDAT1 being image data of a full resolution. The second image data IDAT2 may be generated as a result of the cropping operation.

The image signal processor 130 may perform remosaic on the second image data IDAT2 of a non-Bayer pattern, and thus, the third image data IDAT3 of a Bayer pattern may be generated. Afterwards, down-scaling may be selectively performed on the third image data IDAT3. For example, when the number of pixels of the third image data IDAT3 is more than the maximum number of pixels capable of being output during the zoom-in or zoom-out, the image signal processor 130 may execute the down-scaling to decrease the number of pixels of the third image data IDAT3 to the maximum number of pixels capable of being output during the zoom-in or zoom-out. In contrast, when the number of pixels of the third image data IDAT3 is less than the maximum number of pixels capable of being output during the zoom-in or zoom-out, the image signal processor 130 may execute up-scaling to increase the number of pixels of the third image data IDAT3 to the maximum number of pixels capable of being output during the zoom-in or zoom-out.

Afterwards, when the zoom-in is consistently executed and thus the zoom factor ZF is the reference value RV, the second image sensor 120 may operate instead of the first image sensor 110. For example, the second image sensor 120 may generate the first image data IDAT1 of a full resolution, and may crop the region R2 corresponding to the zoom factor of the reference value RV. The second image sensor 120 may generate the third image data IDAT3 by executing remosaic on the second image data IDAT2, and may selectively perform down-scaling on the third image data IDAT3. A way to selectively perform the down-scaling is similar to that described above.

Figure 8:
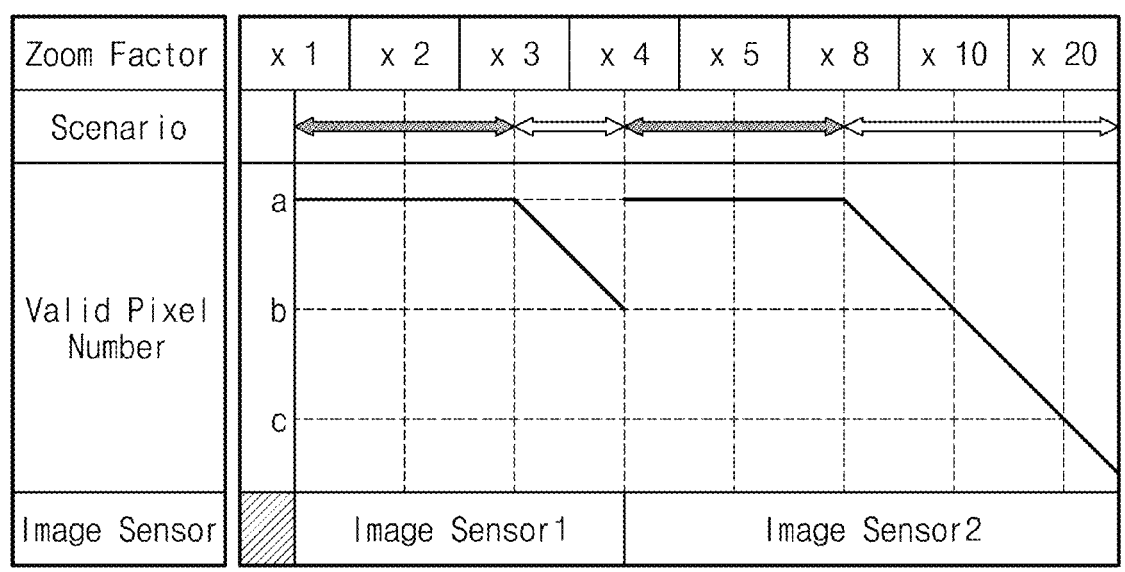
FIG. 8 illustrates an image processing process during zoom-in, according to an embodiment of the present disclosure.

FIG. 8 illustrates an image processing process during zoom-in, according to an embodiment of the present disclosure. The following description describes an example embodiment in which the pixel array of the first image sensor 110 (refer to FIG. 1) includes 108 M (e.g., about 108 million) pixels and the pixel array of the second image sensor 120 (refer to FIG. 1) includes 48 M (e.g., about 48 million) pixels. In this example, the number of pixels of the image data IDAT1 (refer to FIG. 6) of a full resolution that are generated based on the first signal D1 (refer to FIG. 1) may be 108 M, and the number of pixels of the image data IDAT1' (refer to FIG. 6) that are generated based on the second signal D2 (refer to FIG. 1) may be 48 M.

Referring to FIGS. 6 to 8, in a section in which the zoom factor ZF is greater than "1" and is smaller than "3", the image signal processor 130 may generate the first image data IDAT1 of 108 M based on the first signal D1 output from the first image sensor 110. The image signal processor 130 may perform cropping on the first image data IDAT1 of 108 M to generate the second image data IDAT2, and the number of pixels of the second image data IDAT2 may be more than 12 M; this may result from the fact that 108 M divided by $3^2$ is 12 M. The image signal processor 130 may generate the third image data IDAT3 by executing remosaic on the second image data IDAT2, and may generate fourth image data IDAT4 in which the number of pixels is 12 M, by performing down-scaling on the third image data IDAT3 in which the number of pixels is more than 12 M.

Referring to the graph of FIG. 8 showing the above-described image processing, it may be understood that the number of valid pixels is maintained at a specific value "a" (e.g., 12 M) in a section in which the zoom factor ZF is greater than "1" and is smaller than "3". However, in a section in which the zoom factor ZF is greater than "3" and is smaller than "4", it may be understood that the number of valid pixels may decrease to a specific value "b" (e.g., 6.75 M). The reason for the decreased "b" value may be because the resulting number of pixels of image data cropped in the zoom factor ZF is greater than "3" and is smaller than "4" is less than 12 M.

Afterwards, when the zoom factor ZF reaches "4", the second image sensor 120 may operate instead of the first image sensor 110. The image signal processor 130 may generate first image data IDAT1' of 48 M based on the second signal D2 output from the second image sensor 120. The image signal processor 130 may perform cropping on the first image data IDAT1' of 48 M to generate the second image data IDAT2', and the number of pixels of the second image data IDAT2' may be more than 12 M; this may result from the fact that 48 M divided by $2^2$ is 12 M. The image signal processor 130 may generate the third image data IDAT3' by executing remosaic on the second image data IDAT2', and may generate the fourth image data IDAT4' in which the number of pixels is 12 M, by performing down-scaling on the third image data IDAT3' in which the number of pixels is more than 12 M.

Referring to the graph of FIG. 8 showing the above-described image processing, it may be understood that the number of valid pixels is maintained at the specific value "a" (e.g., 12 M) in a section in which the zoom factor ZF is greater than "4" and is smaller than "8". However, in a section in which the zoom factor ZF is greater than "8", it may be understood that the number of valid pixels may decrease to a specific value "c" (e.g., 1.9 M) from the specific value "b" (e.g., 6.75 M). The reason is that the number of pixels of image data cropped in the zoom factor ZF is greater than "8" is less than 12 M.

Because a general image processing device performs cropping on an image of a reduced resolution (e.g., an image experiencing binning or the like), not an image of a full resolution, the number of valid pixels of image data consistently decreases while the zoom-in is being executed. However, in a device according to the present disclosure, because cropping, remosaic, down-scaling, etc. are performed by using image data of a full resolution, a section in which the number of valid pixels is a maximum value (e.g., 12 M in FIG. 8) may be maintained for a relatively long time during the zoom-in operation, and thus, the image quality may be increased in the zoom-in operation.

Figure 9:
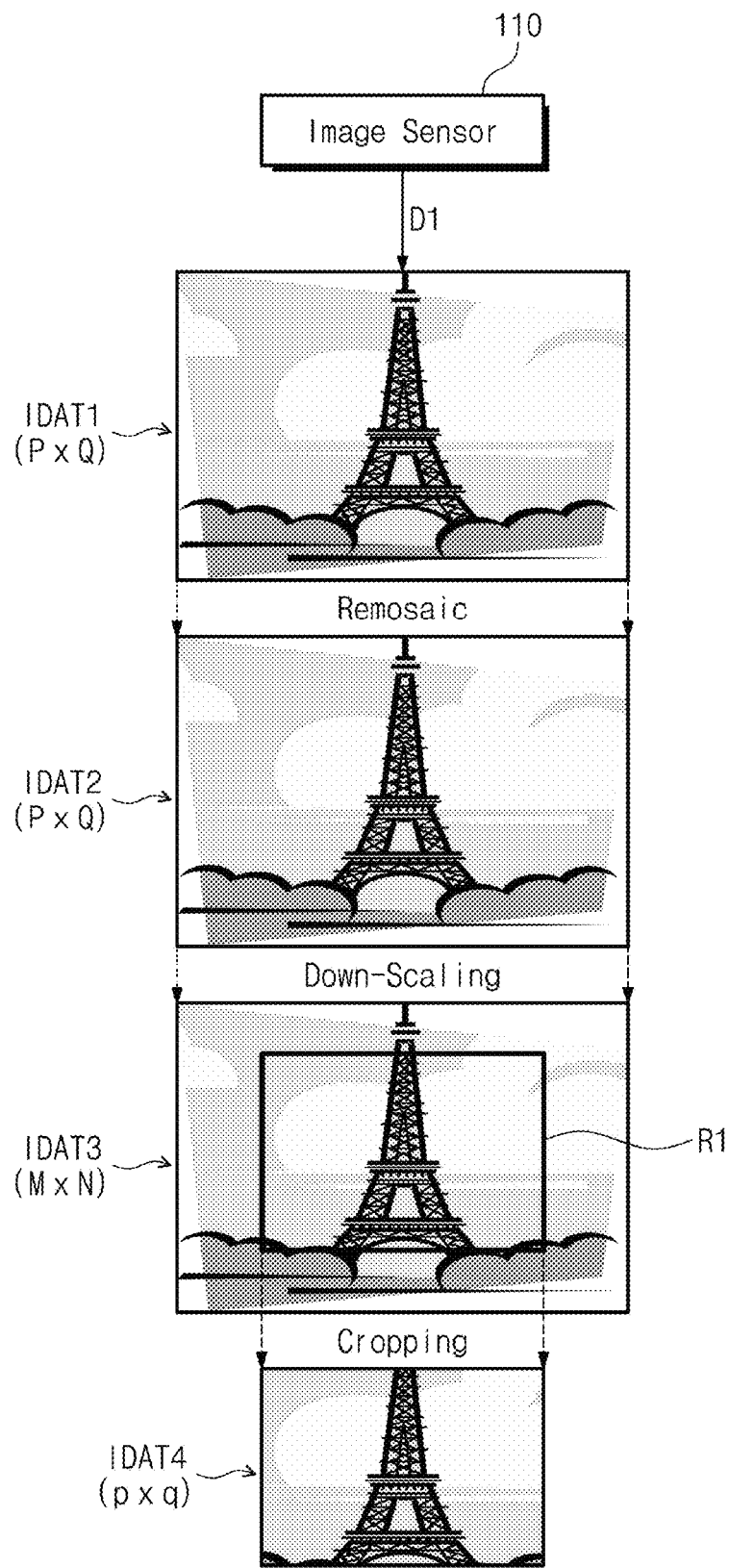
FIG. 9 illustrates an image processing process according to an embodiment of the present disclosure.

FIG. 9 illustrates an image processing process according to an embodiment of the present disclosure. The embodiment of FIG. 9 is mostly similar to the embodiment of FIG. 6, and accordingly the description will be briefly given. In this case, the processing by the second image sensor 120 described with reference to FIG. 6 is omitted, and only the processing by the first image sensor 110 is illustrated. For example, in this case, the process of digital zoom-in may be handled with only image data provided by the first image sensor 110.

Referring to FIGS. 1, 5, 6, and 9, the image signal processor 130 may generate the first image data IDAT1 of a full resolution based on the first signal D1 output from the first image sensor 110. The image signal processor 130 may generate the second image data IDAT2 of a Bayer pattern by executing remosaic on the first image data IDAT1 of a non-Bayer pattern. The image signal processor 130 may generate the third image data IDAT3 by executing down-scaling on the second image data IDAT2, and may generate the fourth image data IDAT4 having a specific number of pixels (e.g., 12 M) by executing cropping on the third image data IDAT3. As described with reference to FIG. 8, in a specific zoom factor section (e.g., 3<ZF<4), the number of valid pixels of the fourth image data IDAT4 may consistently decrease. While the process of FIG. 9 illustrates using only image data from the first image sensor 110, in a specific zoom factor section (e.g., 4<ZF), image processing may be performed based on an output of the second image sensor 120.

Figure 10:
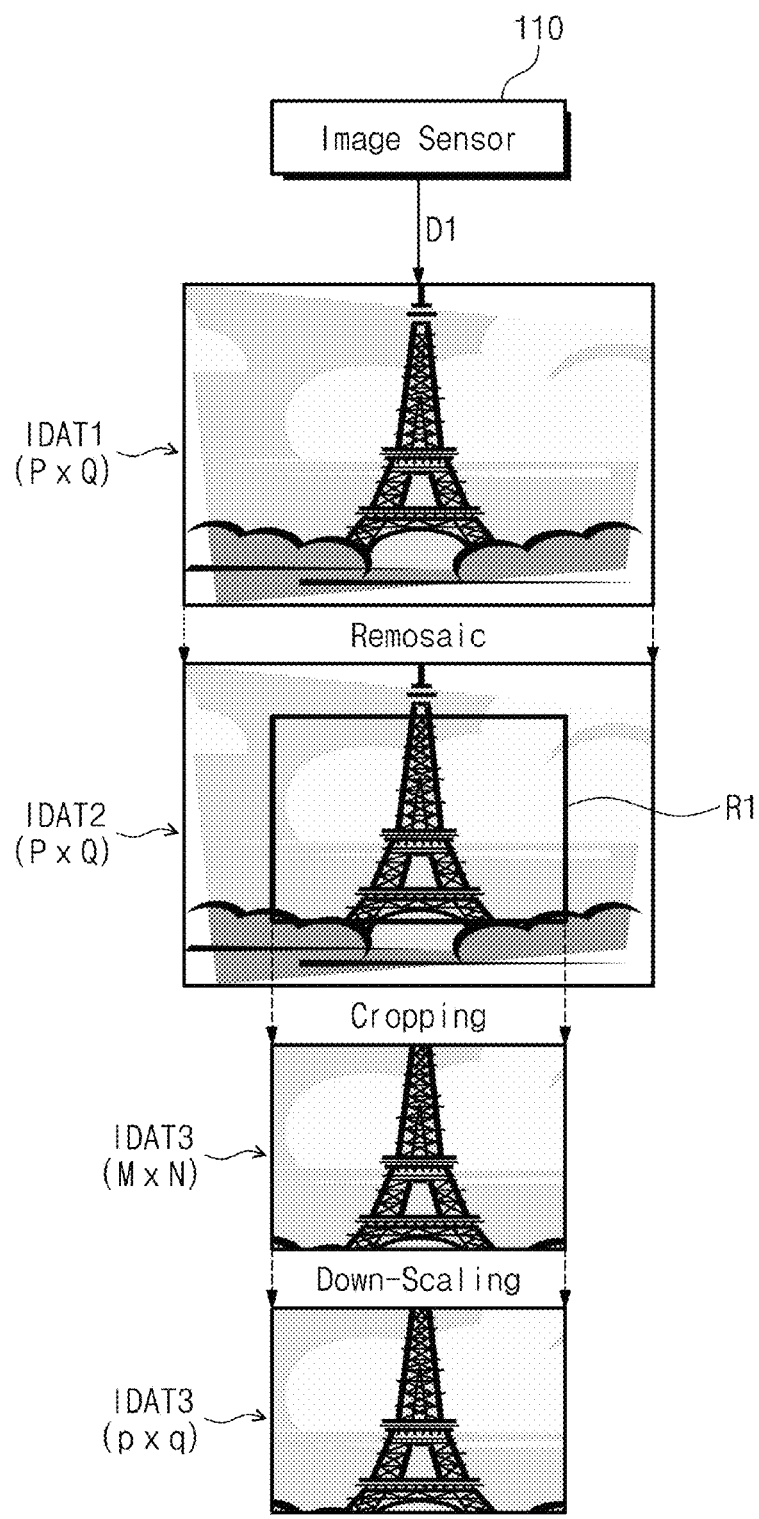
FIG. 10 illustrates an image processing process according to an embodiment of the present disclosure.

FIG. 10 illustrates an image processing process according to an embodiment of the present disclosure. The embodiment of FIG. 10 is mostly similar to the embodiment of FIG. 6 and FIG. 9, and accordingly the description will be briefly given. In this case, the processing by the second image sensor 120, which is described with reference to FIG. 6, is omitted, and only the processing by the first image sensor 110 is illustrated.

Referring to FIGS. 1, 5, 6, and 10, the image signal processor 130 may generate the first image data IDAT1 of a full resolution based on the first signal D1 output from the first image sensor 110. The image signal processor 130 may generate the second image data IDAT2 of a Bayer pattern by executing remosaic on the first image data IDAT1 of a non-Bayer pattern. The image signal processor 130 may generate the third image data IDAT3 by executing cropping on the second image data IDAT2, and may generate the fourth image data IDAT4 having a specific number of pixels (e.g., 12 M) by executing down-scaling on the third image data IDAT3.

How cropping, remosaic, and down-scaling are executed on image data of a full resolution is described above with reference to FIGS. 6, 9, and 10, but the present disclosure is not necessarily limited thereto. For example, the image signal processor 130 may execute cropping, remosaic, and down-scaling in various orders in which image data of a full resolution output from the first image sensor 110 and image data of a full resolution output from the second image sensor 120 are capable of being combined.

Additionally, while the process in which image processing is performed by using two image sensors during the zoom-in of the present disclosure is described in the above embodiments, the present disclosure may be applicable to an image processing block including three or more image sensors. The present disclosure may be applicable to a plurality of image sensors having identical or different fields of view and having identical or different numbers of pixels.

Figure 11:
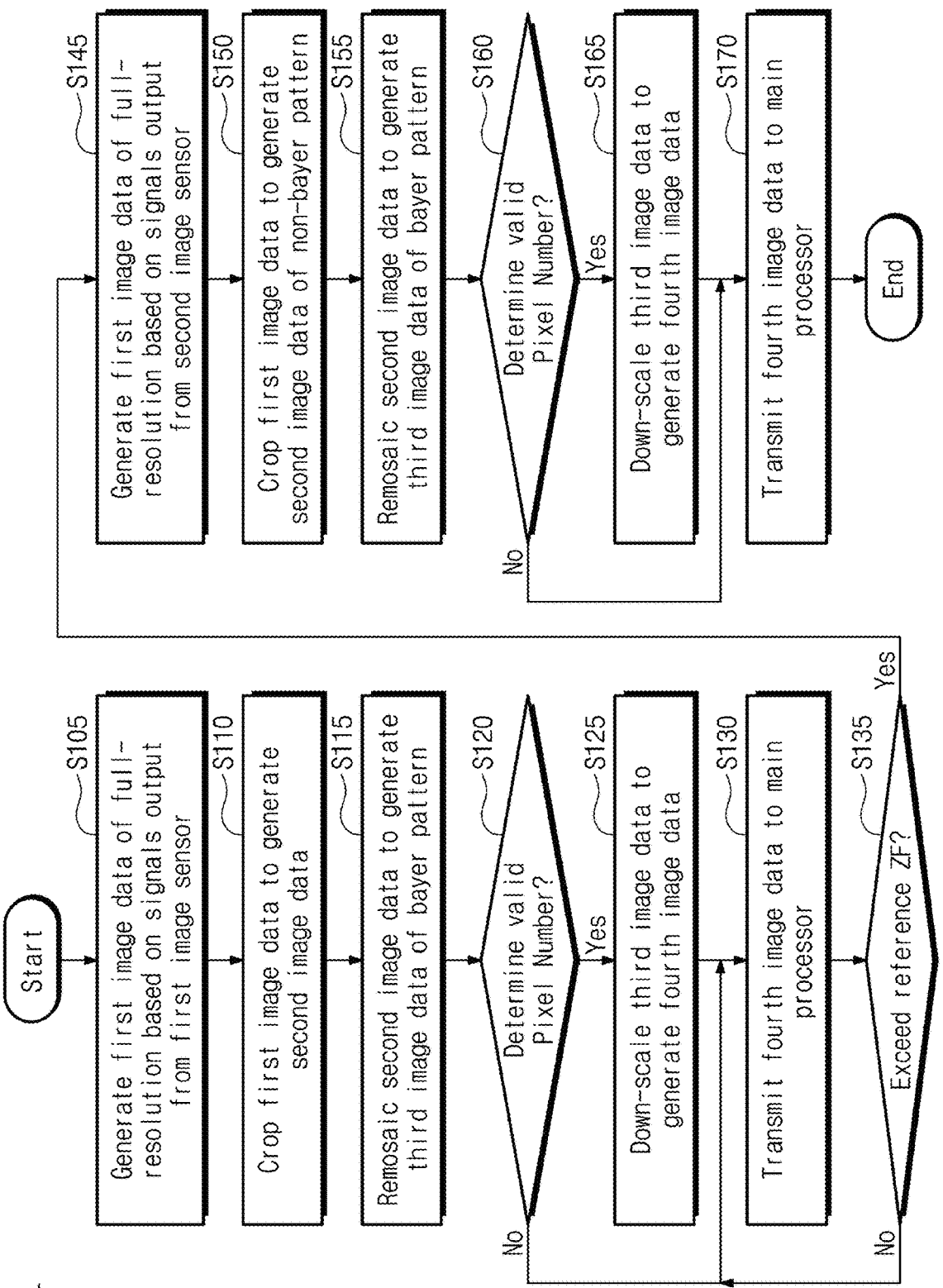
FIG. 11 is a flowchart illustrating an image processing method according to an embodiment of the present disclosure.

FIG. 11 is a flowchart illustrating an image processing method according to an embodiment of the present disclosure.

Referring to FIGS. 1, 6, 8, and 11, while the zoom-in is executed, the image signal processor 130 may generate the first image data IDAT1 of a full resolution based on the first signal D1 output from the first image sensor 110 (operation S105). The image signal processor 130 may generate the second image data IDAT2 by cropping a region of a field of view corresponding to the zoom factor ZF from the first image data IDAT1 of a non-Bayer pattern (operation S110). The image signal processor 130 may generate the third image data IDAT3 of a Bayer pattern by executing remosaic on the second image data IDAT2 (operation S115).

In operation S120, the number of valid pixels of the third image data IDAT3 remosaic-processed may be determined. For example, when the number of valid pixels of the third image data IDAT3 remosaic-processed is larger than the maximum number of pixels capable of being output during the zoom-in (e.g., a Yes decision), the image signal processor 130 may generate the fourth image data IDAT4 by executing down-scaling on the third image data IDAT3 (operation S125). The fourth image data IDAT4 may be transmitted to the main processor 400 (operation S130). In contrast, when the number of valid pixels of the third image data IDAT3 remosaic-processed is less than the maximum number of pixels capable of being output during the zoom-in (e.g., a No decision), the image signal processor 130 may not execute down-scaling on the third image data IDAT3, and the third image data IDAT3 may be transmitted to the main processor 400 (S130).

The fourth image data IDAT4 transmitted to the main processor 400 may be appropriately processed so as to be provided to the user through the display device 300 or may be recorded in response to a user input.

In operation S135, whether the zoom factor ZF received from the main processor 400 exceeds a reference zoom factor may be determined. Here, the reference zoom factor may be a zoom factor causing a change of an image sensor to be operated. For example, when the zoom factor ZF is greater than the reference zoom factor, the first image sensor 110 might not operate, and instead, the second image sensor 120 may operate.

While the zoom-in exceeding the reference zoom factor is executed, the image signal processor 130 may generate the first image data IDAT1' of a full resolution based on the second signal D2 output from the second image sensor 120 (operation S145). The image signal processor 130 may generate the second image data IDAT2' by cropping a region of a field of view corresponding to the zoom factor ZF from the first image data IDAT1' of a non-Bayer pattern (operation S150). The image signal processor 130 may generate the third image data IDAT3' of a Bayer pattern by executing remosaic on the second image data IDAT2' (operation S155).

In operation S160, the number of valid pixels of the third image data IDAT3' remosaic-processed may be determined. For example, when the number of valid pixels of the third image data IDAT3' remosaic-processed is more than the maximum number of pixels capable of being output during the zoom-in (Yes), the image signal processor 130 may generate the fourth image data IDAT4' by executing downscaling on the third image data IDAT3' (operation S165). The fourth image data IDAT4' may be transmitted to the main processor 400 (operation S170). In contrast, when the number of valid pixels of the third image data IDAT3' remosaic-processed is less than the maximum number of pixels capable of being output during the zoom-in (No), the image signal processor 130 might not execute down-scaling on the third image data IDAT3', and the third image data IDAT3' may be transmitted to the main processor 400 (operation S170).

Figure 12:
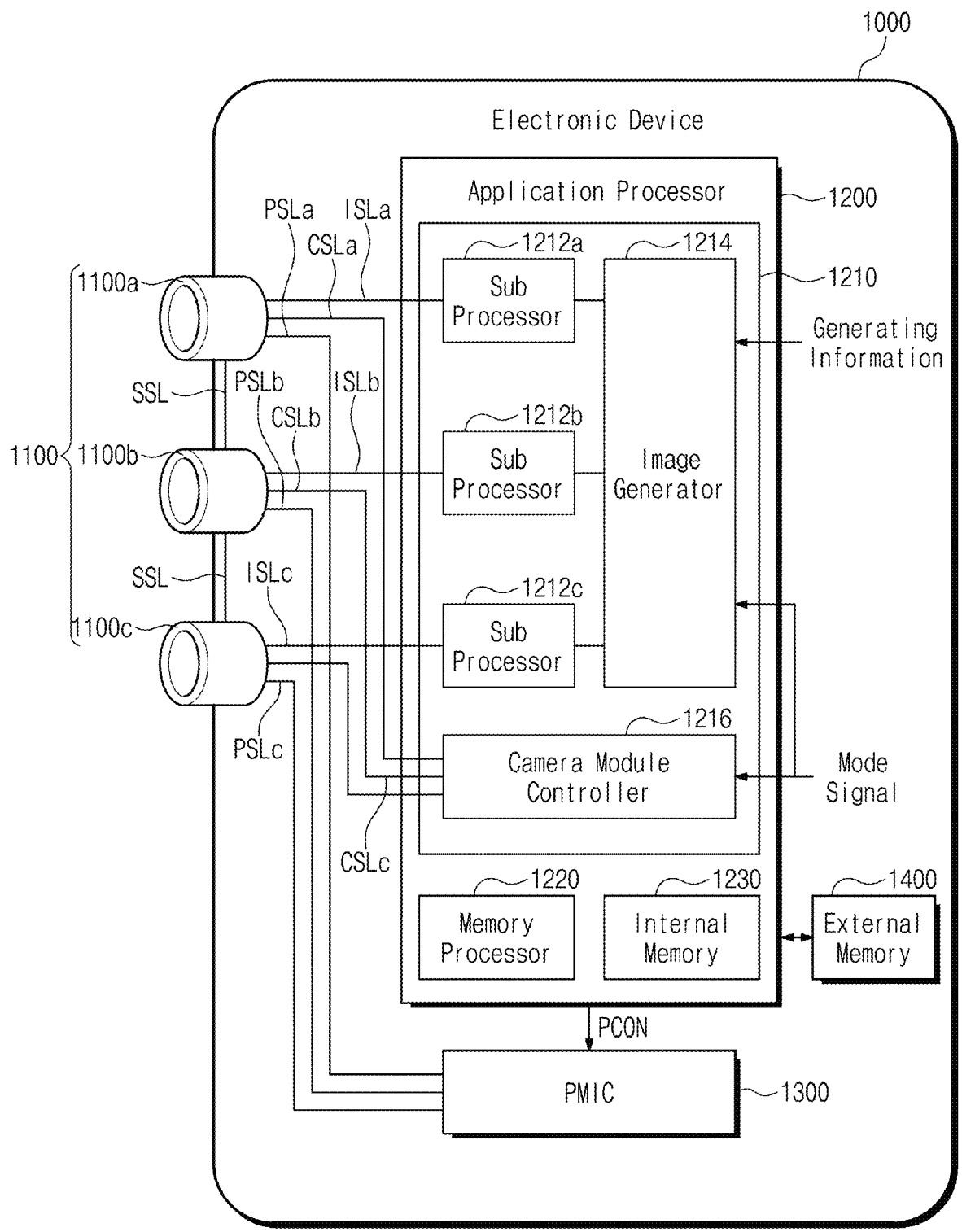
FIG. 12 illustrates a configuration of an electronic device including a camera module in which an image processing device of the present disclosure is implemented.
Figure 13:
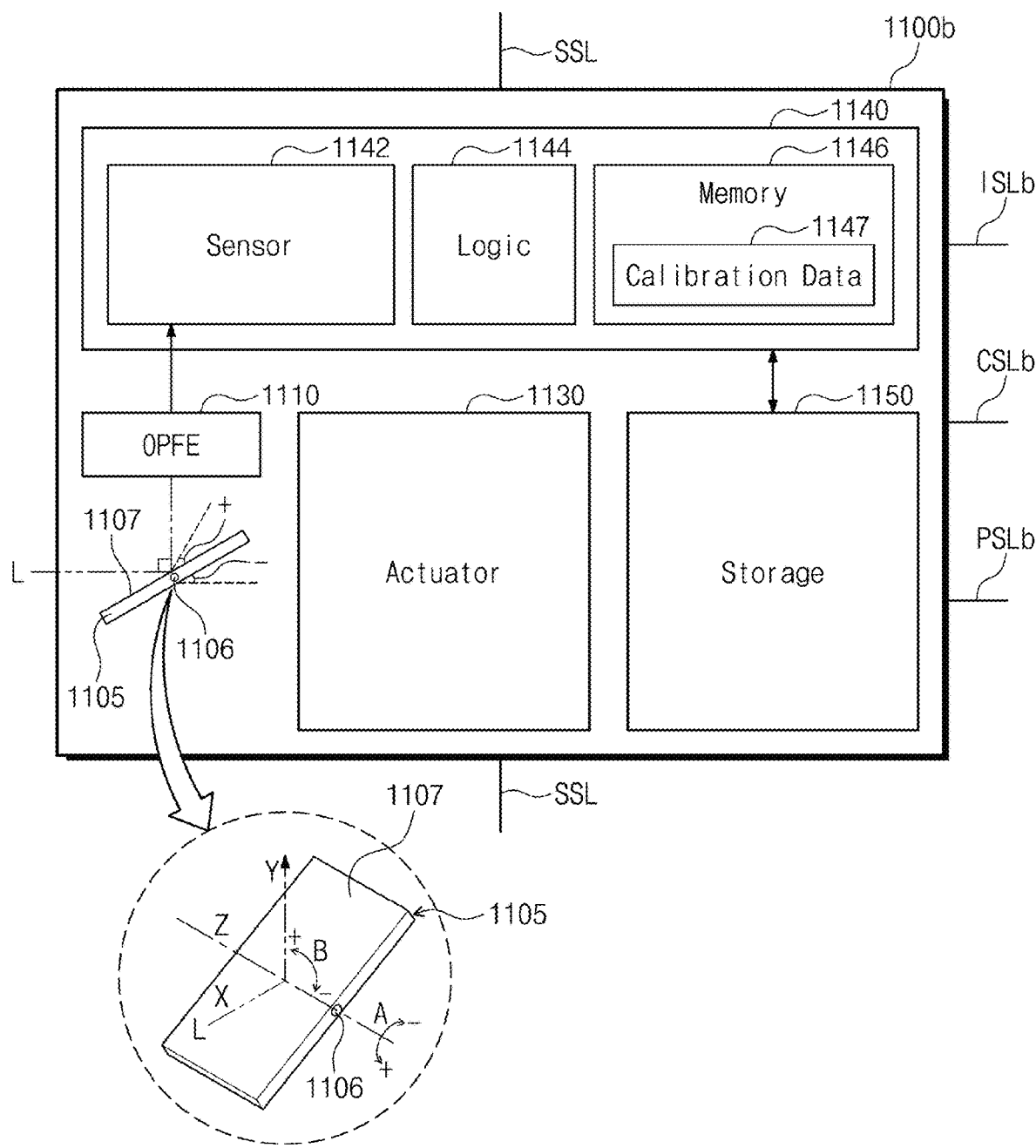
FIG. 13 illustrates a configuration of a camera module of FIG. 12.

FIG. 12 is a configuration of an electronic device including a camera module in which an image processing device of the present disclosure is implemented. FIG. 13 is a configuration of a camera module of FIG. 12.

Referring to FIG. 12, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. An electronic device including three camera modules 1100a, 1100b, and 1100c is illustrated in FIG. 12 as an example, but the present disclosure is not necessarily limited thereto. In some embodiments, the camera module group 1100 may be modified to include only two camera modules. Also, in some embodiments, the camera module group 1100 may be modified to include "n" camera modules (n being a natural number of 4 or more).

Below, a detailed configuration of the camera module 1100b will be more fully described with reference to FIG. 13, but the following description may be applied to the remaining camera modules 1100a and 1100c.

Referring to FIG. 13, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of the light "L" incident in a first direction "X" to a second direction "Y" perpendicular to the first direction "X". The prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In some embodiments, as illustrated, a maximum rotation angle of the prism 1105 in direction "A" may be equal to or smaller than 15 degrees in a positive A direction and may be greater than 15 degrees in a negative A direction, but embodiments are not necessarily limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target from the light "L" provided through an optical lens. The control logic 1144 may control overall operations of the camera module 1100b and may include the image signal processor 130 described above. For example, the control logic 1144 may control an operation of the camera module 1100b based on a control signal provided through a control signal line CSLb.

The memory 1146 may configured to store information necessary for an operation of the camera module 1100b, such as calibration data 1147. The calibration data 1147 may include information necessary for the camera module 1100b to generate accurate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing. The memory 1146 may store information about an ROI (e.g., region of interest) necessary for a movement of a field of view of the present disclosure.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but embodiments are not necessarily limited thereto.

Referring to FIGS. 12 and 13 together, in some embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments, one camera module (e.g., 1100b) among the plurality of camera modules 1100a, 1100b, and 1100c may be a folded lens type of camera module such that the prism 1105 and the OPFE 1110 described above are included in the module, and the remaining camera modules (e.g., 1100a and 1100c) may be a vertical shape of camera module in which the prism 1105 and the OPFE 1110 described above are not included; however, embodiments are not necessarily limited thereto.

In some embodiments, one camera module (e.g., 1100c) among the plurality of camera modules 1100a, 1100b, and 1100c may be, for example, a vertical shape of depth camera configured to receive depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments, at least two camera modules (e.g., 1100a and 1100b) among the plurality of camera modules 1100a, 1100b, and 1100c may have different fields of view from each other. In this case, the at least two camera modules (e.g., 1100a and 1100b) among the plurality of camera modules 1100a, 1100b, and 1100c may include different optical lens, not necessarily limited to.

In some embodiments, fields of view of the plurality of camera modules 1100a, 1100b, and 1100c may be different. In this case, the plurality of camera modules 1100a, 1100b, and 1100c may include different optical lens, not necessarily limited thereto.

In some embodiments, the plurality of camera modules 1100a, 1100b, and 1100c may be physically separated from each other. For example, the plurality of camera modules 1100a, 1100b, and 1100c might not use a sensing area of one image sensor 1142, but the plurality of camera modules 1100a, 1100b, and 1100c may include independent image sensors 1142 therein, respectively.

With reference to FIG. 12, the application processor 1200 may include an image processing device 1210, a memory controller 1220, and an internal memory 1230. The application processor 1200 may be implemented such that it is separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216. The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but embodiments are not necessarily limited thereto.

Meanwhile, in some embodiments, one sub image processor may be disposed to correspond to a plurality of camera modules. For example, the sub image processor 1212a and the sub image processor 1212c may be implemented integrally, and not as separate components as illustrated in FIG. 12; in this case, one of the image data each respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In the example illustrated in FIG. 12, the image generator 1214 may generate the output image by merging at least a portion of the image data respectively generated from the camera modules 1100a, 1100b, and 1100c having different fields of view, depending on the image generating information "Generating Information" or the mode signal. Also, the image generator 1214 may generate the output image by selecting one of the image data respectively generated from the camera modules 1100a, 1100b, and 1100c having different fields of view, depending on the image generating information Generating Information or the mode signal.

In some embodiments, the image generating information "Generating Information" may include a zoom signal or a zoom factor. Also, in some embodiments, the mode signal may be, for example, a signal based on a mode selected from a user.

In the case where the image generating information "Generating Information" is the zoom signal (or zoom factor) and the camera modules 1100a, 1100b, and 1100c have different visual fields (or fields of view), the image generator 1214 may perform different operations in response to the type of the zoom signal. For example, in the case where the zoom signal is a first signal, the image generator 1214 may merge the image data output from the camera module 1100a and the image data output from the camera module 1100c, and may generate the output image by using the merged image signal and the image data output from the camera module 1100b that is not used in the merging operation.

In the case where the zoom signal is a second signal different from the first signal, without the image data merging operation, the image generator 1214 may select one of the image data respectively output from the camera modules 1100a, 1100b, and 1100c and may output the selected image data as the output image. However, embodiments are not necessarily limited thereto, and there may be various ways to process image data which are in accordance with the present disclosure.

In some embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

In one example, one of the plurality of camera modules 1100a, 1100b, and 1100c may be designated as a master camera (e.g., 1100b) depending on the image generating information "Generating Information including" a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

The designations of camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as slave cameras, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and/or a second operating mode, such that the modes change sensing speed.

In the first operating mode, the plurality of camera modules 1100a, 1100b, and 1100c may generate image signals at a first speed (e.g., may generate image signals at a first frame rate), may encode the image signals at a second speed (e.g., may encode the image signal at a second frame rate higher than the first frame rate), and transmit the encoded image signals to the application processor 1200. In this case, the second speed may be 30 times the first speed or less.

At least one of the plurality of camera modules 1100a, 1100b, and 1100c may be used to implement a scanning zoom function. In an embodiment, one camera module including an ultra-high-definition image sensor having a relatively wide field of view may be selected to implement the embodiments of the present disclosure. In another embodiment, two camera modules that respectively include image sensors having the same field of view and have different resolutions may be selected to implement the embodiments of the present disclosure. In another embodiment, two camera modules that respectively include image sensors having different fields of view and have the same resolution may be selected to implement the embodiments of the present disclosure.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding sub image processor among the sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages, to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust one or more level(s) of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

According to embodiments of the present disclosure, while the zoom-in is executed, an image of a field of view corresponding to a zoom factor may be provided based on an image of a full resolution, and thus, a zoom factor section in which a maximum number of valid pixels are provided may increase. For example, in a camera system of an electronic device according to the present disclosure, a zoom-in operation may maintain a maximum number of valid pixels throughout a relatively large section of the zoom-in operation, by performing digital operations on full-resolution image data.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
   a first image sensor configured to photograph in a first field of view to generate a first signal; and
   an image signal processor configured to generate first image data based on the first signal, wherein the first image data is of a non-Bayer pattern,
   and wherein, when a zoom factor is smaller than a first value, the image signal processor is configured to:
   crop the first image data to generate second image data;
   execute remosaic on the second image data to generate third image data of a Bayer pattern; and
   execute down-scaling on the third image data to generate fourth image data.

2. The electronic device of claim 1, wherein, when the zoom factor is between the first value and a second value that is greater than the first value, the image signal processor does not execute the down-scaling on the third image data.

3. The electronic device of claim 2, further comprising a main processor configured to control the zoom factor,
   wherein the main processor is configured to:
   when the zoom factor is smaller than the first value, receive the fourth image data from the image signal processor; and
   when the zoom factor is greater than or equal to the first value and is smaller than the second value, receive the third image data from the image signal processor.

4. The electronic device of claim 2, wherein, when the zoom factor is less than the first value, the image signal processor generates the second image data with a first number of valid pixels, generates the third image data with the first number of valid pixels, and generates the fourth image data with the first number of valid pixels.

5. The electronic device of claim 4, wherein, when the zoom factor is between the first value and the second value, the image signal processor generates the second image data with a second number of valid pixels and generates the third image data with the second number of valid pixels, and
   wherein the second number of valid pixels is fewer than the first number of valid pixels.

6. The electronic device of claim 2, further comprising:
   a second image sensor configured to photograph in a second field of view to generate a second signal,
   wherein, when the zoom factor is greater than or equal to the second value, the image signal processor is configured to:
   generate fifth image data of a non-Bayer pattern based on the second signal;
   crop the fifth image data to generate sixth image data;
   execute remosaic on the sixth image data to generate seventh image data of a Bayer pattern; and
   execute down-scaling on the seventh image data to generate eighth image data.

7. The electronic device of claim 6, wherein, when the zoom factor is between the second value and a third value greater than the second value, the image signal processor does not execute the down-scaling on the seventh image data.

8. The electronic device of claim 7, wherein the main processor is configured to:
   when the zoom factor is between the second value and the third value, receive the eighth image data from the image signal processor; and
   when the zoom factor is greater than or equal to the third value, receive the seventh image data from the image signal processor.

9. The electronic device of claim 7, wherein, when the zoom factor is between the second value and the third value,
   the image signal processor generates the sixth image data with a first number of valid pixels, generates the seventh image data with the first number of valid pixels, and generates the eighth image data with the first number of valid pixels.

10. The electronic device of claim 9, wherein, when the zoom factor is greater than or equal to the third value,
    the image signal processor generates the sixth image data with a third number of valid pixels and generates the seventh image data with the third number of valid pixels, and
    wherein the third number of valid pixels is fewer than the first number of valid pixels.

11. The electronic device of claim 1, wherein the first image sensor includes a pixel array including a first pixel group corresponding to a first color filter and a second pixel group corresponding to a second color filter, and
    wherein pixels of a first unit pixel group of the first pixel group share a first floating diffusion region, and
    wherein pixels of a second unit pixel group of the first pixel group share a second floating diffusion region, and
    wherein pixels of a third unit pixel group of the first pixel group share a third floating diffusion region.

12. The electronic device of claim 6, wherein the second image sensor includes a pixel array including a first pixel group corresponding to a first color filter and a second pixel group corresponding to a second color filter,
    wherein pixels of the first pixel group share a first floating diffusion region, and pixels of the second pixel group share a second floating diffusion region.

13. An image processing method comprising:
    photographing, through a first image sensor and in response to a zoom factor, a scene in a first field of view to generate a first signal, when the zoom factor is smaller than a first value;
    generating, through an image signal processor, first image data based on the first signal, wherein the first image data is of a non-Bayer pattern;
    cropping, through the image signal processor, the first image data to generate second image data;
    executing, through the image signal processor, remosaic on the second image data to generate third image data of a Bayer pattern; and
    executing, through the image signal processor, down-scaling on the third image data to generate fourth image data when the zoom factor is smaller than the first value.

14. The method of claim 13, further comprising:
    transmitting the fourth image data to a main processor when the zoom factor is smaller than the first value; and
    transmitting the third image data to the main processor when the zoom factor is between the first value and a second value greater than the first value.

15. The method of claim 14, wherein, when the zoom factor is smaller than the first value, each of the second image data, the third image data, and the fourth image data has a first number of valid pixels, and
    wherein, when the zoom factor is between the first value and the second value, each of the second image data and the third image data has a second number of valid pixels, and
    wherein the second number of valid pixels is fewer than the first number of valid pixels.

16. The method of claim 14, further comprising:
photographing, through a second image sensor, the scene in a second field of view to generate a second signal, when the zoom factor is greater than or equal to the second value;
generating, through the image signal processor, fifth image data based on the second signal, wherein the fifth image data is of the non-Bayer pattern;
cropping, through the image signal processor, the fifth image data to generate sixth image data;
executing, through the image signal processor, remosaic on the sixth image data to generate seventh image data of the Bayer pattern; and
executing, through the image signal processor, down-scaling on the seventh image data to generate eighth image data, when the zoom factor is greater than the second value.

17. The method of claim 16, further comprising:
transmitting the eighth image data to the main processor, when the zoom factor is between the second value and a third value greater than the second value; and
transmitting the seventh image data to the main processor, when the zoom factor is greater than or equal to the third value.

18. The method of claim 16, wherein, when the zoom factor is between the second value and a third value greater than the second value, each of the sixth image data, the seventh image data, and the eighth image data has a first number of valid pixels,
wherein, when the zoom factor is greater than or equal to the third value, each of the sixth image data and the seventh image data has a third number of valid pixels, and
wherein the third number of valid pixels is fewer than the first number of valid pixels.

19. An electronic device comprising:
a first image sensor configured to photograph in a first field of view to generate a first signal, in a first zoom factor section;
a second image sensor configured to photograph in a second field of view to generate a second signal, in a second zoom factor section; and
an image signal processor configured to generate first image data based on the first signal in the first zoom factor section and to generate second image data based on the second signal in the second zoom factor section, wherein the first image data and the second image data are each of a non-Bayer pattern, and
wherein, in the first zoom factor section, the image signal processor is configured to:
crop the first image data to generate first cropping data;
execute remosaic on the first cropping data to generate first remosaic data of a Bayer pattern; and
execute down-scaling on the first remosaic data to generate first down-scaling data, and
wherein, in the second zoom factor section, the image signal processor is configured to:
crop the second image data to generate second cropping data;
execute remosaic on the second cropping data to generate second remosaic data of the Bayer pattern; and
execute down-scaling on the second remosaic data to generate second down-scaling data.

20. The electronic device of claim 19, wherein, when a zoom factor is greater than or equal to a first value within the first zoom factor section, the image signal processor does not execute the down-scaling on the first remosaic data, and
wherein, when the zoom factor is greater than or equal to a second value within the second zoom factor section, the image signal processor does not execute the down-scaling on the second remosaic data.

* * * * *